United States Patent
Farag et al.

(10) Patent No.: US 12,232,179 B2
(45) Date of Patent: Feb. 18, 2025

(54) 2-STEP RACH RADIO NETWORK TEMPORARY IDENTIFIER (RNTI)

(71) Applicant: Nokia Technologies Oy, Espoo (FI)

(72) Inventors: Emad Farag, Flanders, NJ (US); Samuli Heikki Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 16 days.

(21) Appl. No.: 17/766,779

(22) PCT Filed: Oct. 12, 2020

(86) PCT No.: PCT/EP2020/078532
§ 371 (c)(1),
(2) Date: Apr. 6, 2022

(87) PCT Pub. No.: WO2021/069731
PCT Pub. Date: Apr. 15, 2021

(65) Prior Publication Data
US 2024/0098794 A1    Mar. 21, 2024

Related U.S. Application Data

(60) Provisional application No. 62/913,854, filed on Oct. 11, 2019.

(51) Int. Cl.
*H04W 74/0833*    (2024.01)
*H04W 74/00*    (2009.01)
*H04W 76/11*    (2018.01)

(52) U.S. Cl.
CPC ..... *H04W 74/0833* (2013.01); *H04W 74/006* (2013.01); *H04W 76/11* (2018.02)

(58) Field of Classification Search
CPC ............ H04W 74/0833; H04W 76/11; H04W 74/006
See application file for complete search history.

(56) References Cited

U.S. PATENT DOCUMENTS

| | | | |
|---|---|---|---|
| 11,785,648 B2 * | 10/2023 | Xiong | H04W 74/085 370/329 |
| 11,917,681 B2 * | 2/2024 | Kusashima | H04W 74/0841 |
| 2019/0141695 A1 | 5/2019 | Babaei et al. | |
| 2019/0141742 A1 | 5/2019 | Zhou et al. | 74/85 |
| 2022/0201744 A1 * | 6/2022 | Shrestha | H04W 76/27 |
| 2022/0279593 A1 * | 9/2022 | Zheng | H04W 72/0446 |

OTHER PUBLICATIONS

3GPP TSG RAN WG1 Meeting #96bis, Xi'an, China, Apr. 8-12, 2019, R1-1903879, "On 2-Step RACH Procedures", ZTE, Sanechips, 10 pgs.
3GPP TSG ranWG1 Meeting #98bis, Chongqing, China, Oct. 14-20, 2019, R1-1910003, "Remaining issues of 2-step RACH procedures", ZTE, Sanechips, 19 pgs.
3GPP TSG-RAN WG2 Meeting #107bis, Chongqing, China, Oct. 14-18, 2019, R2-1913168, "Considerations on MsgB reception", Fujitsu, 5 pgs.

* cited by examiner

*Primary Examiner* — Chandrahas B Patel
(74) *Attorney, Agent, or Firm* — Joseph C. Drish; McCarter & English, LLP

(57) ABSTRACT

Apparatuses, methods, and computer programs for determining and using a radio network temporary identifier are disclosed. A method includes determining an offset; determining a first radio network temporary identifier based, at least partially, upon the offset; and using the first radio network temporary identifier for subsequently transmitting a message to a device.

35 Claims, 4 Drawing Sheets

| | PRACH SLOT | | | | | | | | | | | | | |
|---|---|---|---|---|---|---|---|---|---|---|---|---|---|---|
| SYMBOL IN SLOT | S0 | S1 | S2 | S3 | S4 | S5 | S6 | S7 | S9 | S9 | S10 | S11 | S12 | S13 |
| RO IN SLOT | RO0 | | RO1 | | RO2 | | RO3 | | RO4 | | RO5 | | | |

PRACH SLOT STRUCTURE FOR PRACH CONFIGURATION INDEX 16 IN FR2 WITH UNPAIRED SPECTRUM (TABLE 6.3.3.2-4 OF TS 38.211)

FIG.4

| | PRACH SLOT | | | | | | | | | | | | | |
|---|---|---|---|---|---|---|---|---|---|---|---|---|---|---|
| SYMBOL IN SLOT | S0 | S1 | S2 | S3 | S4 | S5 | S6 | S7 | S9 | S9 | S10 | S11 | S12 | S13 |
| RO IN SLOT | RO0 | | | | RO1 | | | | RO2 | | | | | |

PRACH SLOT STRUCTURE FOR PRACH CONFIGURATION INDEX 42 IN FR2 WITH UNPAIRED SPECTRUM (TABLE 6.3.3.2-4 OF TS 38.211)

FIG.5

SLOT CONFIGURATION WITH 60 kHz SLOT OF PRACH CONFIGURATION INDEX 16 IN FR2
WITH UNPAIRED SPECTRUM (TABLE 6.3.3.2-4 OF TS 38.211)

SLOT CONFIGURATION OF PRACH CONFIGURATION INDEX 17 IN FR2
WITH UNPAIRED SPECTRUM (TABLE 6.3.3.2-4 OF TS 38.211)

2-STEP RACH RADIO NETWORK TEMPORARY IDENTIFIER (RNTI)

CROSS REFERENCE TO RELATED APPLICATION

This patent application is a U.S. National Stage application of International Patent Application Number PCT/EP2020/078532 filed Oct. 12, 2020, which is hereby incorporated by reference in its entirety, and claims priority to U.S. provisional application 62/913,854 filed Oct. 11, 2019, which is hereby incorporated by reference in its entirety.

TECHNICAL FIELD

The example and non-limiting embodiments relate generally to communications and, more particularly, to a temporary identifier.

BACKGROUND

It is known to synchronize communications between a terminal and a radio node in a wireless network.

SUMMARY

In accordance with an aspect, a method includes determining an offset; determining a first radio network temporary identifier based, at least partially, upon the offset; and using the first radio network temporary identifier for subsequently transmitting a message to a device.

In accordance with an aspect, an apparatus includes at least one processor; and at least one non-transitory memory including computer program code, the at least one memory and the computer program code configured to, with the at least one processor, cause the apparatus to: determine an offset; determine a first radio network temporary identifier based, at least partially, upon the offset; and use the first radio network temporary identifier for subsequently transmitting a message to a device.

In accordance with an aspect, a non-transitory program storage device readable by a machine, tangibly embodying a program of instructions executable by the machine for performing operations is provided, the operations comprising: determining an offset; determining a first radio network temporary identifier based, at least partially, upon the offset; and using the first radio network temporary identifier for subsequently transmitting a message to a device.

In accordance with an aspect, an apparatus includes means for determining an offset; means for determining a first radio network temporary identifier based, at least partially, upon the offset; and means for using the first radio network temporary identifier for subsequently transmitting a message to a device.

In accordance with an aspect, a method includes determining a radio network temporary identifier based, at least partially, upon a type of a random access channel.

In accordance with an aspect, an apparatus includes at least one processor; and at least one non-transitory memory including computer program code, the at least one memory and the computer program code configured to, with the at least one processor, cause the apparatus to: determine a radio network temporary identifier based, at least partially, upon a type of a random access channel.

In accordance with an aspect, a non-transitory program storage device readable by a machine, tangibly embodying a program of instructions executable by the machine for performing operations may be provided, the operations comprising: determining a radio network temporary identifier based, at least partially, upon a type of a random access channel.

In accordance with an aspect, an apparatus includes means for determining a radio network temporary identifier based, at least partially, upon a type of a random access channel.

In accordance with an aspect, a method includes receiving an offset from a network equipment; and determining a first radio network temporary identifier based, at least partially, upon the received offset.

In accordance with an aspect, an apparatus includes at least one processor; and at least one non-transitory memory including computer program code, the at least one memory and the computer program code configured to, with the at least one processor, cause the apparatus to: receive an offset from a network equipment; and determine a first radio network temporary identifier based, at least partially, upon the received offset.

In accordance with an aspect, a non-transitory program storage device readable by a machine, tangibly embodying a program of instructions executable by the machine for performing operations may be provided, the operations comprising: receiving an offset from a network equipment; and determining a first radio network temporary identifier based, at least partially, upon the received offset.

In accordance with an aspect, an apparatus includes means for receiving an offset from a network equipment; and means for determining a first radio network temporary identifier based, at least partially, upon the received offset.

BRIEF DESCRIPTION OF THE DRAWINGS

The foregoing aspects and other features are explained in the following description, taken in connection with the accompanying drawings, wherein:

FIG. 4 shows the PRACH slot structure for PRACH configuration index 16.

FIG. 5 shows the PRACH slot structure for PRACH configuration index 42.

DETAILED DESCRIPTION OF EMBODIMENTS

Figure 1:
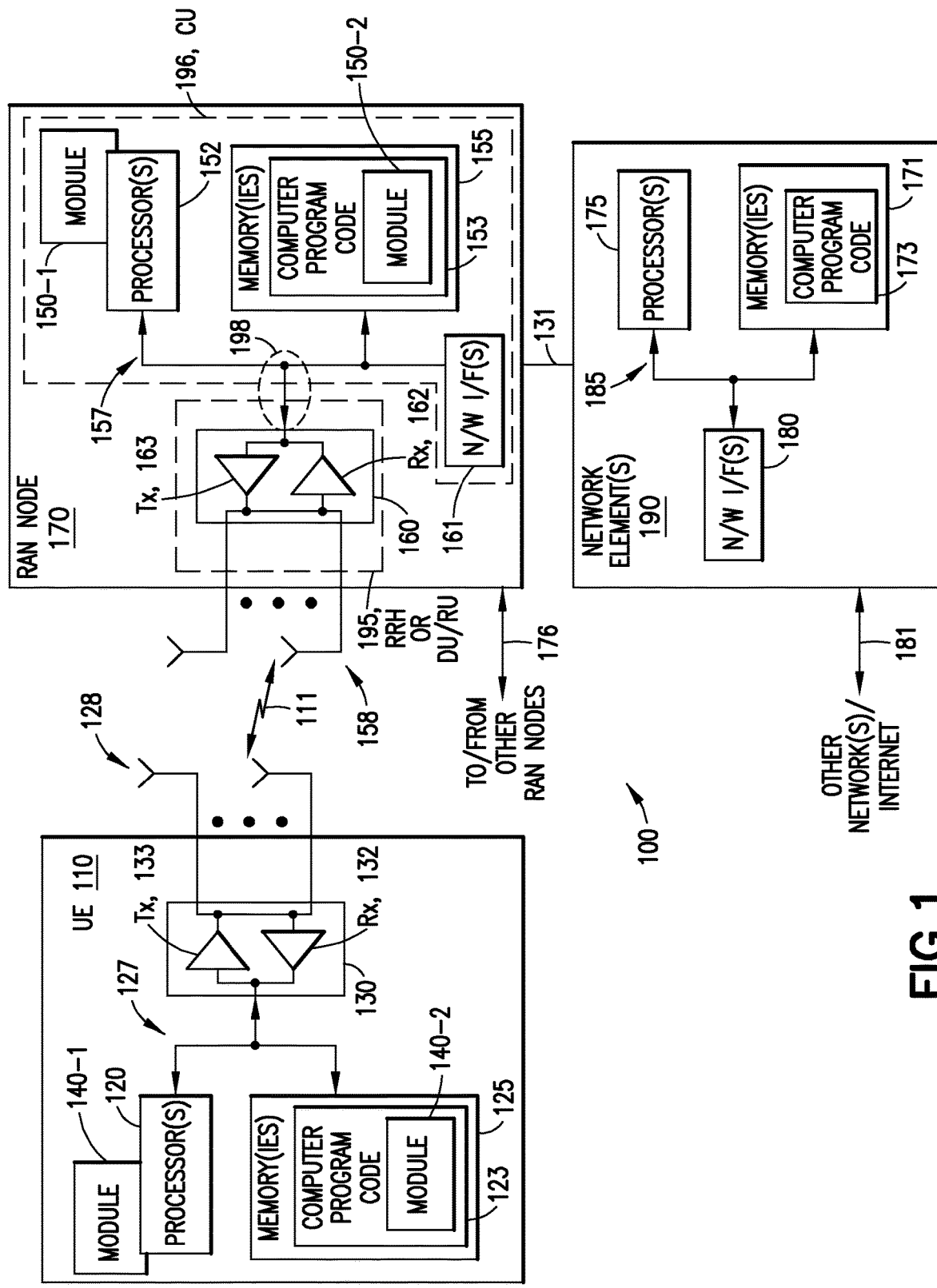
FIG. 1 is a block diagram of one possible and non-limiting system in which the example embodiments may be practiced.

The following acronyms and abbreviations that may be found in the specification and/or the drawing figures are defined as follows:

| | |
|---|---|
| 3GPP | third generation partnership project |
| 5G | fifth generation |
| 5GC | 5G core network |
| AMF | access and mobility management function |
| CORESET | Control Resource Set |
| CRC | cyclic redundancy check |
| CU | central unit |
| DCI | downlink control information |
| DU | distributed unit |
| eNB (or eNodeB) | evolved Node B (e.g., an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, i.e., the LTE radio access technology |
| gNB (or gNodeB) | base station for 5G/NR, i.e., a node providing NR user plane and control plane protocol terminations towards the UE, and connected via the NG interface to the 5GC |
| I/F | interface |
| LTE | long term evolution |
| MAC | medium access control |
| MME | mobility management entity |
| ng or NG | new generation |
| ng-eNB or NG-eNB | new generation eNB |
| NR | new radio |
| N/W or NW | network |
| PDCCH | Physical Downlink Control Channel |
| PDCP | packet data convergence protocol |
| PDSCH | Physical Downlink Shared Channel |
| PHY | physical layer |
| PRACH | Physical Random Access Channel |
| PUSCH | Physical Uplink Shared Channel |
| RA-RNTI | Random Access RNTI |
| RACH | Random Access Channel |
| RAN | radio access network |
| Rel | release |
| RLC | radio link control |
| RNTI | Radio Network Temporary Identifier |
| RO | PRACH Occasion |
| RRH | remote radio head |
| RRC | radio resource control |
| RU | radio unit |
| Rx | receiver |
| SCS | Subcarrier spacing |
| SDAP | service data adaptation protocol |
| SGW | serving gateway |
| SMF | session management function |
| TS | technical specification |
| Tx | transmitter |
| UE | user equipment (e.g., a wireless, typically mobile device) |
| UL | uplink |
| UPF | user plane function |

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
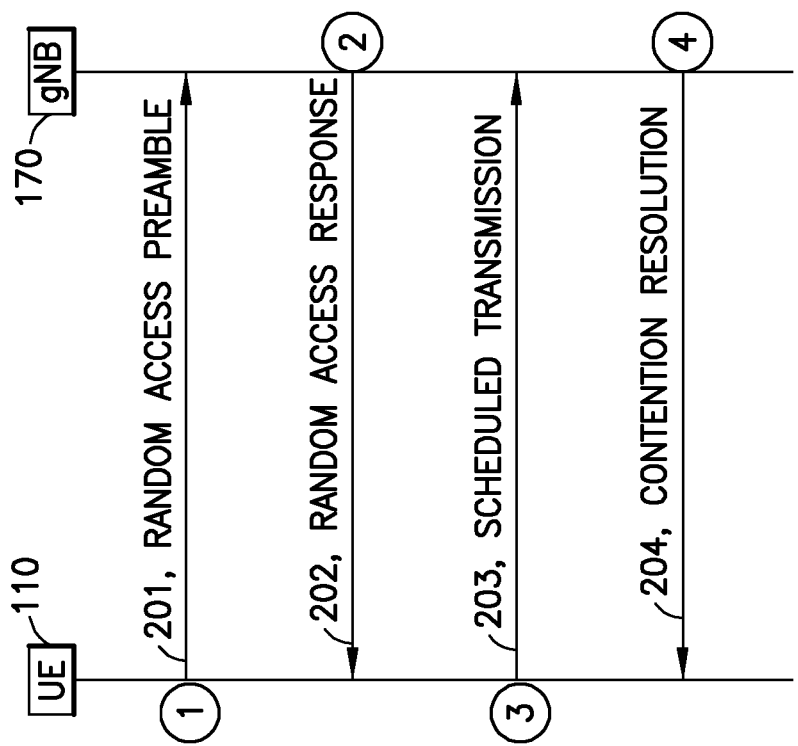
FIG. 2 shows the basic procedure for 4-step contention-based random access.

A 4-step RACH procedure is supported in Release 15 NR (New Radio). FIG. 2 shows the basic procedure for 4-step contention-based random access as also described in TS 38.300 V15.4.0, "NR; NR and NG-RAN Overall Description; Stage 2", 3GPP, September 2019. There are four messages Msg1 201, Msg2 202, Msg3 203 and Msg4 204 which are exchanged between two devices, such as the UE 110 and the network node 170 (a base station (gNB) in this example).

Figure 3:
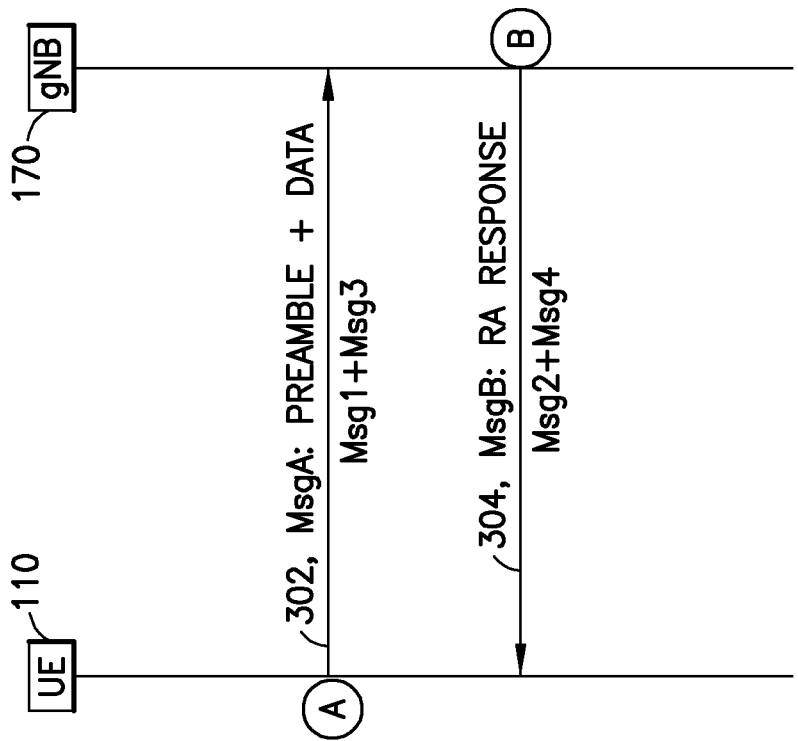
FIG. 3 shows the 2-step RACH procedure.

In RAN #82 a new work item to introduce a new RACH type on "2-step RACH for NR" was agreed as indicated in RP-182894, "New work item: 2-step RACH for NR", ZTE Corporation, Sanechips, 3GPP RN #89, Sorrento, Italy, December 2018 for example. The 2-step RACH procedure is shown in FIG. 3. In two-step RACH, MsgA 302 combines the preamble signal (Msg1) and the data signal (Msg3), and MsgB 304 combines the random access response (Msg2) and the contention resolution (Msg4).

MsgB 304 is a downlink transmission that includes a Physical Downlink Control Channel (PDCCH) transmission followed by a Physical Downlink Shared Channel (PDSCH) transmission. The PDCCH contains downlink L1 control information (downlink control information (DCI)) with a cyclic redundancy check (CRC) scrambled by a Radio Network Temporary Identifier (RNTI). The UE 110 monitors that PDCCH in a search space monitoring occasion associated with a Control Resource Set (CORESET). When the UE successfully receives the PDCCH scrambled with the expected RNTI, the UE proceeds to receive the associated PDSCH based on the scheduling information conveyed in the downlink control information (DCI).

In 4-step RACH, Msg2 has a PDCCH with a cyclic redundancy check (CRC) scrambled by the Random Access RNTI (RA-RNTI). According to TS 38.321, the equation for determining the RA-RNTI depends on the time-frequency location as well as the carrier (Normal UL or supplementary UL) used for a Physical Random Access Channel (PRACH) preamble transmission that is being responded to in Msg2. The equation for determining the RA-RNTI [as noted in TS 38.321] is:

$$RA\text{-}RNTI = 1 + s\_id + 14 \times t\_id + 14 \times 80 \times f\_id + 14 \times 80 \times 8 \times ul\_carrier\_id \quad \text{(Eq. 1)}$$

where:
- s_id is the index of the first OFDM symbol of the PRACH occasion ($0 \leq s\_id < 14$),
- t_id is the index of the first slot of the PRACH occasion in a system frame ($0 \leq t\_id < 80$),
- f_id is the index of the PRACH occasion in the frequency domain ($0 \leq f\_id < 8$), and
- ul_carrier_id is the UL carrier used for Random. Access Preamble transmission (0 for NUL carrier, and 1 for SUL carrier).

The RA-RNTI occupies values from 1 to 17920. The RNTI is a 16-bit value in the range from 0 to 65535. Therefore, the RA-RNTI occupies over 25 percent of the available RNTI space. With features as described herein, a method may be used for determining the RNTI of MsgB that has a distinct value from that of Msg2, while the total RNTI space used for Msg2 and MsgB remains the same.

Examining equation 1 noted above, used to calculate the RA-RNTI for Msg2, it is noted that not all RA-RNTI values are used for Msg2. For example, symbol ID (s_id) is limited by the starting symbols of PRACH Occasions (ROs) within a PRACH slot. Furthermore, the slot ID (t_id) is limited by the PRACH slot IDs allowed for a specific PRACH configuration index as given by Tables 6.3.3.2-2/3/4 of TS 38.211.

With features as described herein, the MsgB-RNTI may be calculated with an addition of an offset as:

$$MsgB\text{-}RNTI = RA\text{-}RNTI(\text{of Msg2}) + \text{Offset} \quad \text{(Eq. 2)}$$

For example:

$$MsgB\text{-}RNTI = 1 + s\_id + 14 \times t\_id + 14 \times 80 \times f\_id + 14 \times 80 \times 8 \times ul\_carrier\_id + \text{offset} \quad \text{(Eq. 3)}$$

where, the "offset" is calculated such that MsgB-RNTI is an unused value in the RA-RNTI space of Msg2. Examples to demonstrate how to achieve this are described below.

In another example embodiment, the ID of the PRACH Occasion in the frequency domain (f_id) is allowed to exceed the range [0-7], and f_id values greater than these eight are mapped to unused values in the RA-RNTI. For this purpose, we calculate two intermediate values:

$$A = f\_id \mod 8$$

$$B = \text{Floor}(f\_id/8)$$

$$\text{RA-RNTI} = 1 + s\_id + 14 \times t\_id + 14 \times 80 \times A + 14 \times 80 \times 8 \times ul\_carrier\_id + f_{offset}(B) \quad \text{(Eq. 4)}$$

where, $f_{offset}(B)$ is a function of B that maps to an offset corresponding to an unused value in the RA-RNTI space. For B=0, $f_{offset}(0)=0$. For other values of B the offset is calculated as shown by example below.

Consider, as an example, preamble format A1 and PRACH configuration index 16 in NR frequency band FR2 with an unpaired spectrum (Table 6.3.3.2-4 of TS 38.211). Preamble format A1 has a duration of 2 symbols. This is the shortest preamble format along with B1 and C0 and, hence, has the greatest number of starting symbols for PRACH occasion in a slot (up to 6 or 7 ROs in a slot). The PRACH slot structure for PRACH configuration index 16 is shown in FIG. 4.

As an example, assuming a PRACH slot with f_id=0, t_id=0, ul_carrier_id=0, the allowed RA-RNTI values for this slot are as shown in the Table 1 below (middle column):

TABLE 1

| PRACH Occasion Index in Slot | RA-RNTI (with f_id = 0, t_id = 0, ul_carrier_id = 0) | MsgB RNTI = RA-RNTI + 1 (offset) |
|---|---|---|
| PR0 | 1 | 2 |
| PR1 | 3 | 4 |
| PR2 | 5 | 6 |
| PR3 | 7 | 8 |
| PR4 | 9 | 10 |
| PR5 | 11 | 12 |

In this example, RA-RNTI values corresponding to the old symbols are not used. By setting the offset=1 for MsgB-RNTI, we get the MsgB RNTI values shown in last column of Table 1. As can be seen in comparing the last column in Table 1 to the middle column in Table 1, for each PRACH Occasion (RO), the MsgB RNTI in the last column has a distinct different value verses the RA-RNTI for Msg2 in the middle column.

In another example embodiment, for 4-step RACH and/or for 2-step RACH the range of f_id can exceed 7, for example, f_id=[0-15]. The RA-RNTI can be calculated as:

$$\text{RA-RNTI} = 1 + s\_id + 14 \times t\_id + 14 \times 80 \times (f\_id \mod 8) + 14 \times 80 \times 8 \times ul\_carrier\_id + \text{floor}(f\_id/8) \quad \text{(Eq. 5)}$$

Note "(f_id mod 8)" and "floor (f_id/8)" in Equation 5 above.

Table 2 below shows two examples of the RA-RNTI values with one having f_id in the range of [0-7] and the other having f_id outside the range of [0-7]. In particular, Table 2 shows in the middle column the allowed RA-RNTI value in a PRACH slot with t_id=0, ul_carrier_id=0 and f_id=0 and Table 2 shows in the last column the allowed RA-RNTI value in a PRACH slot with t_id=0, ul_carrier_id=0 and f_id=8.

TABLE 2

| PRACH Occasion Index in Slot | RA-RNTI (with f_id = 0, t_id = 0, ul_carrier_id = 0) | RA-RNTI (with f_id = 8, t_id = 0, ul_carrier_id = 0) |
|---|---|---|
| PR0 | 1 | 2 |
| PR1 | 3 | 4 |
| PR2 | 5 | 6 |
| PR3 | 7 | 8 |
| PR4 | 9 | 10 |
| PR5 | 11 | 12 |

As a further extension to this example embodiment, consider an example regarding preamble format A2 and PRACH configuration index 42 in FR2 with unpaired spectrum (Table 6.3.3.2-4 of TS 38.211). Preamble format A2 has a duration of 4 symbols. Hence there are three starting symbols for ROs within a slot leaving even more unused RA-RNTI space. The PRACH slot structure for PRACH configuration index 42 is shown in FIG. 5.

In one example, for 4-step RACH, the f_id is in the range [0-31]. The RA-RNTI is calculated based on the equation:

$$\text{RA-RNTI} = 1 + s\_id + 14 \times t\_id + 14 \times 80 \times (f\_id \mod 8) + 14 \times 80 \times 8 \times ul\_carrier\_id + \text{floor}(f\_id/8) \quad \text{(Eq. 6)}$$

Regarding examples of the allowed RA-RNTI in a PRACH slot with t_id=0, ul_carrier_id=0 and f_id=0 or f_id=8 or f_id=16 or f_id=24, these are shown in Table 3 below:

TABLE 3

| PRACH Occasion Index in Slot | RA-RNTI (with f_id = 0, t_id = 0, ul_carrier_id = 0) | RA-RNTI (with f_id = 8, t_id = 0, ul_carrier_id = 0) | RA-RNTI (with f_id = 16, t_id = 0, ul_carrier_id = 0) | RA-RNTI (with f_id = 24, t_id = 0, ul_carrier_id = 0) |
|---|---|---|---|---|
| PR0 | 1 | 2 | 3 | 4 |
| PR1 | 5 | 6 | 7 | 8 |
| PR2 | 9 | 10 | 11 | 12 |

In another example, both 2-step RACH and 4-step RACH are supported with f_id in the range [0-15]. The RA-RNTI offset for Msg2 can be given by:

$$\text{RA-RNTI}=1+s\_id+14\times t\_id+14\times 80\times (f\_id \bmod 8)+14\times 80\times 8\times ul\_carrier\_id+\text{floor}(f\_id/8) \quad \text{(Eq. 7)}$$

Note "(f_id mod 8)" and "floor(f_id/8)" in this equation.

The MsgB RA-RNTI offset may be given by:

$$\text{MsgB-RNTI}=1+s\_id+14\times t\_id+14\times 80\times (f\_id \bmod 8)+14\times 80\times 8\times ul\_carrier\_id+\text{floor}(f\_id/8)+2 \quad \text{(Eq. 8)}$$

Note "(f_id mod 8)" and "floor (f_id/8)+2" in this equation.

As examples, the allowed RA-RNTI (for Msg2) and MsgB-RNTI in a PRACH slot with t_id=0, ul_carrier_id=0 and f_id=0 or f_id=8 are shown in the Table 4 below:

TABLE 4

| PRACH Occasion Index in Slot | RA-RNTI (with f_id = 0, t_id = 0, ul_carrier_id = 0) | RA-RNTI (with f_id = 8, t_id = 0, ul_carrier_id = 0) | MsgB-RNTI (with f_id = 0, t_id = 0, ul carrier id = 0) | MsgB-RNTI (with f_id = 8, t_id = 0, ul_carrier_id = 0) |
|---|---|---|---|---|
| PR0 | 1 | 2 | 3 | 4 |
| PR1 | 5 | 6 | 7 | 8 |
| PR2 | 9 | 10 | 11 | 12 |

In an alternate example, the RA-RNTI (for Msg2) and MsgB-RNTI may be given by:

$$\text{RA-RNTI}=1+s\_id+14\times t\_id+14\times 80\times (f\_id \bmod 8)+14\times 80\times 8\times ul\_carrier\_id+2*\text{floor}(f\_id/8) \quad \text{(Eq. 9)}$$

$$\text{MsgB-RNTI}=1+s\_id+14\times t\_id+14\times 80\times (f\_id \bmod 8)+14\times 80\times 8\times ul\_carrier\_id+2*\text{floor}(f\_id/8)+1 \quad \text{(Eq. 10)}$$

Note "(f_id mod 8)" and "2*floor(f_id/8)" and "2*floor (f_id/8)+1" in these equations.

Figure 6:
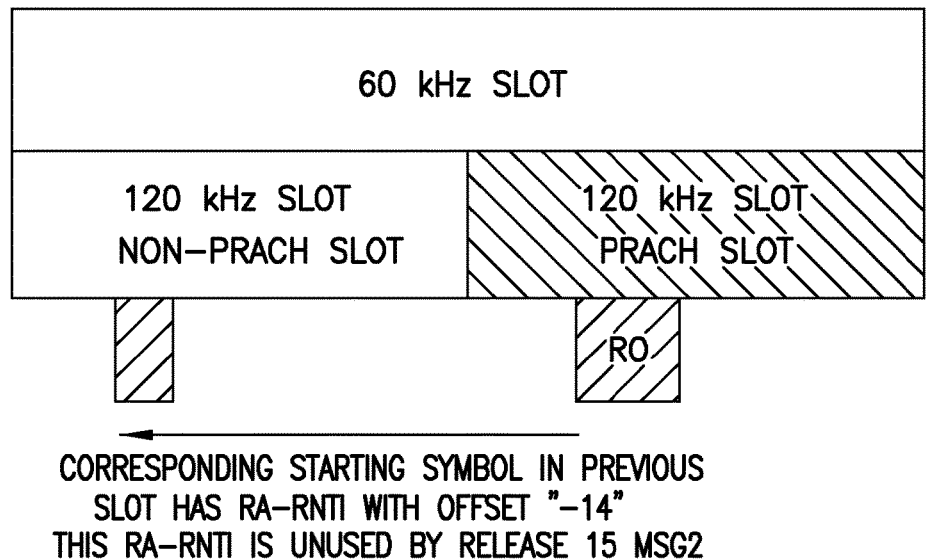
FIG. 6 shows an offset of "−14" relative to the RA-RNTI of Msg2 pointing to an unused RNTI that can be used for MsgB.

Consider further, as an example, preamble format A1 and PRACH configuration index 16 in FR2 with unpaired spectrum (Table 6.3.3.2-4 of TS 38.211). PRACH configuration index has "Number of PRACH slots within a 60 kHz slot"=1. For 120 kHz Subcarrier Spacing (SCS), this means that in a 60 kHz slot, the second 120 kHz is PRACH slot and the first 120 kHz slot is not used for PRACH. In this case, as shown in FIG. 6, an offset of "−14" relative to the RA-RNTI of Msg2 points to an unused RNTI that can be used for MsgB.

Figure 7:
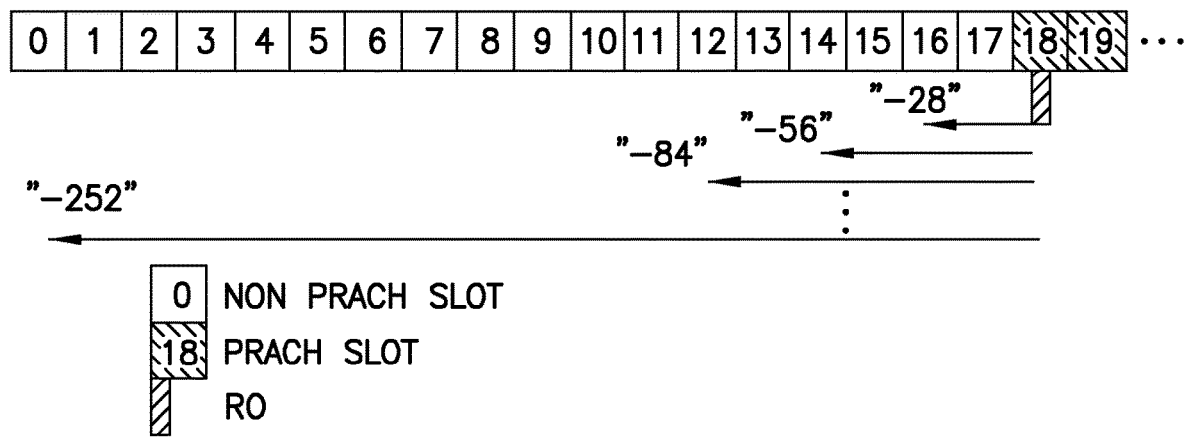
FIG. 7 shows an offset of "−28", "−56", "−84", "−112", . . . "−252" relative to the RA-RNTI of Msg2 pointing to an unused RNTI that can be used for MsgB.

Consider further, as an example, preamble format A1 and PRACH configuration index 17 in FR2 with unpaired spectrum (Table 6.3.3.2-4 of TS 38.211). PRACH configuration index has "Number of PRACH slots within a 60 kHz slot"=2. For 120 kHz SCS, this means that in a 60 kHz slot, both 120 kHz slots are PRACH slots. However, in this configuration, 60 kHz slots {9, 19, 29, 39} are used for PRACH. The remaining 60 kHz slots have no PRACH. If PRACH has SCS of 120 kHz, then slots {18, 19, 38, 39, 58, 59, 78, 79} are used for PRACH. In this case, as shown in FIG. 7, an offset of "−28", "−56", "−84", "−112", . . . "−252" relative to the RA-RNTI of Msg2 points to an unused RNTI that can be used for MsgB.

In a further example embodiment, the offset between RA-RNTI for Msg2 and the MsgB-RNTI for an RO may be a fixed value in a specification. For example, this value may be 1.

In a further example embodiment, the offset between the RA-RNTI for Msg2 and the MsgB-RNTI for a RO may be a value that is configured by the network.

The MsgB RNTI has not been decided yet by 3GPP. There are two possible choices for the MsgB RNTI.

Option 1: MsgB RNTI uses the RA-RNTI of Msg2, (i.e. it uses the time/frequency resource and UL carrier of the PRACH occasion used to transmit the 2-step RACH preamble, using the same equation as that used for 4-step RACH RA-RNTI).

Option 2: MsgB has a unique RNTI different from that of Msg2.

RAN1 has already agreed that 2-step RACH supports PRACH Occasions (ROs) which are either shared with 4-step RACH or which are separate from 4-step RACH. As noted in R1-1905764 (RAN1 #96b Xi'an), for the relation of PRACH resources between 2-step and 4-step RACH, the network has the flexibility to configure the following options:

Separate ROs are configured for 2-step and 4-step RACH
Shared RO but separate preambles for 2-step and 4-step RACH For Option 1 above, when the 2-step RACH and the 4-step RACH share a same RO, a 2-step RACH preamble and a 4-step RACH preamble transmitting in that RO would have a same RA-RNTI. Hence, without features as described herein, if the Msg2 and MsgB have the same PDCCH search space monitoring occasions and control resource set (CORESET), the UE would not be able to distinguish a Msg2 response for a 4-step RACH versus a MsgB response for a 2-step RACH. However, RAN2 has already agreed that Msg2 and MsgB should not be multiplexed in the same PDSCH. Hence, if MsgB and Msg2 use the same RA-RNTI, without features as described herein, there would need to configure the MsgB Search Space/CORESET such that there is no partial or full overlapping between the search space monitoring occasions/CORESET of Msg2 and those of MsgB. This would obviously have a disadvantage in limiting the ability of the network in allocating monitoring occasions for PDCCH.

For Option 2 above, separate ROs would be configured for 2-step and 4-step RACH with MsgB having a unique RNTI. A straight forward way, albeit brute force, would be to add the RACH type to the RA-RNTI equation. In this case the RA-RNTI equation becomes:

$$\text{RA-RNTI}=1+s\_id+14\times t\_id+14\times 80\times f\_id+14\times 80\times 8\times ul\_carrier\_id+14\times 80\times 8\times 2\text{RACH\_type} \quad \text{(Eq. 11)}$$

where the RACH_type can be 0 for a 4-step RACH procedure (i.e. Msg2) or 1 for a 2-step RACH procedure (i.e. MsgB). The downside to this approach is that it increases the RA-RNTI space from 17920 to 35840. This would be over half of the available RNTI values which would not be desired. Features as described herein may be used without such a large increase in use of RA-RNTI space.

With features as described herein, a method may be provided for determining the RNTI of MsgB which will have a distinct value from that of Msg2, but with the total RNTI space used for Msg2 and MsgB remaining the same. In other words, with a system having the capability to use two different RACH procedures (such as the 4-Step procedure shown in FIG. 2 and the 2-Step procedure shown in FIG. 3 for example), use of RNTI space will not need to increase versus a system able to use only one of those procedures (such as the 4-Step procedure shown in FIG. 2). This may be accomplished with the RNTI of MsgB having a different value from the RNTI of Msg2. Furthermore, this method may be used if the number of PRACH Occasions (ROs) in the frequency domain exceeds eight (i.e., f_id≥8). The radio network temporary identifier is not transmitted to the UE. Rather, the offset is determined by the network, and this offset is sent to the UE. Both the UE and the network may calculate the RNTI based on this offset and the RO of the MsgA preamble. The offset is determined by the network such that the RNTI of Msg2 and MsgB are distinct (i.e. MsgB uses an unused RA-RNTI value of Msg2).

With features as described herein, because the value of MsgB-RNTI may be different from the value of RA-RNTI of Msg2, this allows the same PDCCH search space monitoring occasions and CORESET to be used for both Msg2 and MsgB. Thus, with features as described herein, the example methods may be used to not increase the size of the RA-RNTI space currently used with Msg2. With features as used herein, the "RACH_type" value as in Equation 11 above may still be used. The "RACH_type" may be used to determine an offset to be added to the RA-RNTI. For example, the offset might be 0 for a 4-step RACH, and 1 for a 2-step RACH.

With features as described herein, there may be two RNTI values:
  The first RNTI may be calculated based on the equation in 38.321.
  The second RNTI may be calculated by adding an offset (offset can be positive or negative) to the first RNTI, such that the new RNTI value corresponds to an unused value of the first RNTI. The second RNTI is used for MsgB, or the second RNTI is used for Msg2 with f_id greater than or equal to eight.

Both the UE and network may do this calculation. The calculation of the second RNTI may be based upon:
  a fixed offset
  a configured offset.
  a function of the f_id and/or RACH_type (a simple function was given above using the mod and floor functions).

Please note that the terms "first" and "second" are used here and in the claims merely to distinguish between the two RNTIs, and should not necessarily be considered as a sequential order. For example, the terminology of the "first" RNTI may be referring to the RNTI used for MsgB, and the terminology of the "second" RNTI may be referring to the RNTI used for Msg2 with f_id less than eight.

In accordance with one example, an example method may be provided comprising: determining an offset; determining a first radio network temporary identifier based, at least partially, upon the offset; and using the first radio network temporary identifier for subsequently transmitting a message to a device.

The method may further comprise transmitting the offset to the device. The determining of the first radio network temporary identifier may comprise calculating the first radio network temporary identifier based upon the offset and a PRACH Occasion of a MsgA preamble. The determining of the offset may be based upon an unused value in a random access radio network temporary identifier (RA-RNTI) space of a message of a multi-step contention based random access procedure. The message may be a Msg2 message of a 4-step contention based random access procedure, and the determining of the offset may be based upon the unused value in the random access radio network temporary identifier (RA-RNTI) space of the Msg2 message. The method may further comprise determining a second radio network temporary identifier on a same physical downlink control channel search space monitoring occasion and a control resource set as the first radio network temporary identifier, where the first radio network temporary identifier and the second radio network temporary identifier are for respective different types of random access channel procedures. The determining of the first radio network temporary identifier may be based, at least partially, upon a random access radio network temporary identifier of a Msg2 in a 4-step contention based random access procedure. The determining of the first radio network temporary identifier may be based, at least partially, upon a time and frequency location of a PRACH Occasion within a radio frame where the first radio network temporary identifier is associated with a message corresponding to a preamble in the PRACH Occasion. The determining of the first radio network temporary identifier may be based, at least partially, upon an ID of a PRACH Occasion in a frequency domain (f_id) having a value of 8 or more. The ID of the PRACH Occasion in the frequency domain (f_id) having the value of 8 or more may be mapped to an unused value in a RA-RNTI for Msg2 of a 4-step contention based random access procedure. The determining of the offset may be based upon determining, in regard to an unpaired spectrum or a paired spectrum, a slot not used in a physical random access channel configuration. The offset may be a difference between a Physical Random Access Channel (PRACH) slot and a non-PRACH slot in a number of symbols. The determining of the offset may be based upon determining a symbol that is not a starting symbol of a PRACH Occasion (RO), where the offset may be a difference between the starting symbol of the PRACH Occasion and a non-starting symbol of the PRACH Occasion. The offset may be a fixed value. The offset may be configured by a network equipment. The offset may be calculated based on a formula or a function.

In accordance with one example embodiment, an apparatus may be provided comprising: at least one processor; and at least one non-transitory memory including computer program code, the at least one memory and the computer program code configured to, with the at least one processor, cause the apparatus to: determine an offset; determine a first radio network temporary identifier based, at least partially, upon the offset; and use the first radio network temporary identifier for subsequently transmitting a message to a device.

In accordance with one example embodiment, a non-transitory program storage device readable by a machine may be provided, tangibly embodying a program of instructions executable by the machine for performing operations, the operations comprising: determining an offset; determining a first radio network temporary identifier based, at least partially, upon the offset; and using the first radio network temporary identifier for subsequently transmitting a message to a device.

In accordance with one example embodiment, an apparatus may be provided comprising: means for determining an offset; means for determining a first radio network temporary identifier based, at least partially, upon the offset; and means for using the first radio network temporary identifier for subsequently transmitting a message to a device.

An example method may be provided comprising: receiving an offset from a network equipment; and determining a first radio network temporary identifier based, at least partially, upon the received offset. The determining of the first radio network temporary identifier may comprise calculating the first radio network temporary identifier based upon the offset and a PRACH Occasion of a MsgA preamble. The offset may be based upon an unused value in a random access radio network temporary identifier (RA-RNTI) space of a message of a multi-step contention based random access procedure. The message may be a Msg2 message of a 4-step contention based random access procedure and, the offset may be based upon the unused value in the random access radio network temporary identifier (RA-RNTI) space of the Msg2 message. The method may further comprise determining a second radio network temporary identifier on a same physical downlink control channel search space monitoring occasion and control resource set as the first radio network temporary identifier, where the first radio network temporary identifier and the second radio network temporary identifier are for respective different types of random access channel procedures. The determining of the first radio network temporary identifier may be based, at least partially, upon a random access radio network temporary identifier of a Msg2 message in a 4-step contention based random access procedure. The determining of the first radio network temporary identifier may be based, at least partially, upon a time and frequency location of a PRACH Occasion within a radio frame where the first radio network temporary identifier is associated with a message corresponding to a preamble in the PRACH Occasion. The determining of the first radio network temporary identifier may be based, at least partially, upon an ID of a PRACH Occasion in a frequency domain (f_id) having a value of 8 or more. The ID of the PRACH Occasion in the frequency domain (f_id) having the value of 8 or more may be mapped to an unused value in a RA-RNTI for a Msg2 message of a 4-step contention based random access procedure. The offset may be a difference between a Physical Random Access Channel (PRACH) slot and a non-PRACH slot in a number of symbols. The offset may be a fixed value. The offset may be configured by a network equipment. The offset may be calculated from a function or a formula. The determining of the first radio network temporary identifier may comprise calculating the first radio network temporary identifier for a MsgB or for a Msg2 with f_id is greater than or equal to 8 using the offset and calculating a second different radio network temporary identifier of a different Msg2. The method may further comprise using the first radio network temporary identifier to scramble a cyclic redundancy check of a physical downlink control channel associated with a downlink message sent from the network equipment. The downlink message may be a MsgB message or a Msg2 message. The UE may calculate the RNTI for MsgB, or Msg2 with f_id greater than or equal to 8, using the offset and a RNTI of a Msg2 with f_id less than eight.

With features as described herein, the UE may get an offset and use the offset, along with the RO of the preamble, to calculate the RNTI. The Offset may be a fixed value, a value configured by the network, or a value calculated from a function. The RNTI may be used to scramble the CRC of the PDCCH associated with a downlink message sent from the gNB to the UE. In this case, the downlink message may be a MsgB message or a Msg2 message.

In accordance with one example embodiment, an apparatus may be provided comprising: at least one processor; and at least one non-transitory memory including computer program code, the at least one memory and the computer program code configured to, with the at least one processor, cause the apparatus to: receive an offset from a network equipment; and determine a first radio network temporary identifier based, at least partially, upon the received offset.

In accordance with one example embodiment, a non-transitory program storage device readable by a machine may be provided, tangibly embodying a program of instructions executable by the machine for performing operations, the operations comprising: receiving an offset from a network equipment; and determining a first radio network temporary identifier based, at least partially, upon the received offset.

In accordance with one example embodiment, an apparatus may be provided comprising: means for receiving an offset from a network equipment; and means for determining a first radio network temporary identifier based, at least partially, upon the received offset.

In accordance with one example embodiment, a method may be provided comprising: determining a radio network temporary identifier based, at least partially, upon a type of a random access channel.

Other aspects of the method may include the following. The radio network temporary identifier may be further determined based on an offset when 2-step RACH is used. The offset may be a fixed value. The offset may be configured by a network equipment. The offset may be calculated from a function or a formula. The offset may be 14×80×8×2. The method may further include determining the offset to be 14×80×8×2. The radio network temporary identifier may be associated with a PRACH occasion in which a random access preamble is transmitted.

In accordance with one example embodiment, an apparatus may be provided comprising: at least one processor; and at least one non-transitory memory including computer program code, the at least one memory and the computer program code configured to, with the at least one processor, cause the apparatus to: determine a radio network temporary identifier based, at least partially, upon a type of a random access channel.

Other aspects of the apparatus may include the following. The radio network temporary identifier may be further determined based on an offset when 2-step RACH is used. The offset may be a fixed value. The offset may be configured by a network equipment. The offset may be calculated from a function or a formula. The offset may be 14×80×8×2. The at least one memory and the computer program code may be further configured to, with the at least one processor, cause the apparatus to determine the offset to be 14×80×8×2. The radio network temporary identifier may be associated with a PRACH occasion in which a random access preamble is transmitted.

In accordance with one example embodiment, a non-transitory program storage device readable by a machine, tangibly embodying a program of instructions executable by the machine for performing operations may be provided, the operations comprising: determining a radio network temporary identifier based, at least partially, upon a type of a random access channel.

Other aspects of the non-transitory program storage device may include the following. The radio network temporary identifier may be further determined based on an offset when 2-step RACH is used. The offset may be a fixed value. The offset may be configured by a network equipment. The offset may be calculated from a function or a formula. The offset may be 14×80×8×2. The operations may further comprise determining the offset to be 14×80×8×2.

The radio network temporary identifier may be associated with a PRACH occasion in which a random access preamble is transmitted.

In accordance with one example embodiment, an apparatus may be provided comprising: means for determining a radio network temporary identifier based, at least partially, upon a type of a random access channel.

Other aspects of the apparatus may include the following. The radio network temporary identifier may be further determined based on an offset when 2-step RACH is used. The offset may be a fixed value. The offset may be configured by a network equipment. The offset may be calculated from a function or a formula. The offset may be 14×80×8×2. The apparatus may further include means for determining the offset to be 14×80×8×2. The radio network temporary identifier may be associated with a PRACH occasion in which a random access preamble is transmitted.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   determining an offset;
   where the determining of the offset is based upon an unused value in a random access radio network temporary identifier space of a message, where the message is a Msg2 message of a 4-step contention based random access procedure;
   determining a first radio network temporary identifier based, at least partially, upon the offset; and
   using the first radio network temporary identifier for subsequently transmitting a message to a device.

2. The method as in claim 1 further comprising transmitting the offset to the device.

3. The method as in claim 1 where the determining of the first radio network temporary identifier comprises calculating the first radio network temporary identifier based upon the offset and a physical random access channel (PRACH) occasion of a MsgA preamble.

4. The method as in claim 1 where the determining of the offset is based upon determining a symbol that is not a starting symbol of a physical random access channel (PRACH) occasion (RO), where the offset is a difference between the starting symbol of the PRACH occasion and a non-starting symbol of the PRACH occasion.

5. The method as in claim 1 where the offset is a fixed value.

6. The method as in claim 1 further comprising determining a second radio network temporary identifier on a same physical downlink control channel search space monitoring occasion and control resource set as the first radio network temporary identifier, where the first radio network temporary identifier and the second radio network temporary identifier are for respective different types of random access channel procedures.

7. The method as in claim 1 where the determining of the first radio network temporary identifier is based, at least partially, upon an identifier (ID) of a physical random access channel (PRACH) occasion in a frequency domain (f_id) having a value of 8 or more.

8. The method as in claim 1 where the determining of the first radio network temporary identifier is based, at least partially, upon a time and frequency location of a physical random access channel (PRACH) occasion within a radio frame where the first radio network temporary identifier is associated with a message corresponding to preamble in the PRACH occasion.

9. The method as in claim 7 where the ID of the PRACH occasion in the frequency domain (f_id) having the value of 8 or more is mapped to the unused value in the random access radio network temporary identifier (RA-RNTI) for the Msg2 of the 4-step contention based random access procedure, or to another unused value in the random access radio network temporary identifier (RA-RNTI) for the Msg2 of the 4-step contention based random access procedure.

10. The method as in claim 1 where the determining of the first radio network temporary identifier is based, at least partially, upon the random access radio network temporary identifier of the Msg2 in the 4-step contention based random access procedure.

11. The method as in claim 1 where the determining of the offset is based upon determining, in regard to an unpaired spectrum and/or a paired spectrum, a slot not used in a physical random access channel configuration.

12. The method as in claim 1 where the offset is a difference between a physical random access channel (PRACH) slot and a non-PRACH slot in a number of symbols.

13. An apparatus comprising:
    at least one processor; and
    at least one memory storing instructions that, when executed by the at least one processor, cause the apparatus at least to:
    determine an offset;
    where the determining of the offset is based upon an unused value in a random access radio network temporary identifier space of a message, where the message is a Msg2 message of a 4-step contention based random access procedure;
    determine a first radio network temporary identifier based, at least partially, upon the offset; and
    use the first radio network temporary identifier for subsequently transmitting a message to a device.

14. A non-transitory program storage device readable by a machine, tangibly embodying a program of instructions executable by the machine for performing operations, the operations comprising:
    determining an offset;
    where the determining of the offset is based upon an unused value in a random access radio network temporary identifier space of a message, where the message is a Msg2 message of a 4-step contention based random access procedure;
    determining a first radio network temporary identifier based, at least partially, upon the offset; and
    using the first radio network temporary identifier for subsequently transmitting a message to a device.

15. A method comprising:
    determining an offset; and
    determining a radio network temporary identifier based, at least partially, upon a type of a random access channel and the offset;
    where the determining of the offset is based upon an unused value in a random access radio network temporary identifier space of a message, where the message is a Msg2 message of a 4-step contention based random access procedure.

16. The method of claim 15, where the radio network temporary identifier is determined based on the offset or another offset different from the offset when a 2-step random access channel (RACH) procedure is used.

17. The method of claim 16, where the offset or the another offset is a fixed value.

18. The method of claim 16, where the offset or the another offset is calculated from a function or a formula.

19. The method of claim 16, where the offset or the another offset is 14×80×8×2.

20. The method of claim 16, further comprising determining the offset or the another offset to be 14×80×8×2.

21. The method of claim 15, where the radio network temporary identifier is associated with a physical random access channel (PRACH) occasion in which a random access preamble is transmitted.

22. A non-transitory program storage device readable by a machine, tangibly embodying a program of instructions executable by the machine for performing operations, the operations comprising:
    determining an offset; and
    determining a radio network temporary identifier based, at least partially, upon a type of a random access channel and the offset;
    where the determining of the offset is based upon an unused value in a random access radio network temporary identifier space of a message, where the message is a Msg2 message of a 4-step contention based random access procedure.

23. The non-transitory program storage device of claim 22, where the radio network temporary identifier is determined based on the offset or another offset different from the offset when a 2-step random access channel (RACH) procedure is used.

24. The non-transitory program storage device of claim 23, where the offset or the another offset is a fixed value.

25. The non-transitory program storage device of claim 23, where the offset or the another offset is calculated from a function or a formula.

26. The non-transitory program storage device of claim 23, where the offset or the another offset is 14×80×8×2.

27. The non-transitory program storage device of claim 23, the operations further comprising determining the offset or the another offset to be 14×80×8×2.

28. The non-transitory program storage device of claim 22, where the radio network temporary identifier is associated with a physical random access channel (PRACH) occasion in which a random access preamble is transmitted.

29. An apparatus comprising:
    at least one processor; and
    at least one memory storing instructions that, when executed by the at least one processor, cause the apparatus at least to:
    determine an offset; and
    determine a radio network temporary identifier based, at least partially, upon a type of a random access channel and the offset;
    where the determining of the offset is based upon an unused value in a random access radio network temporary identifier space of a message, where the message is a Msg2 message of a 4-step contention based random access procedure.

30. The apparatus of claim 29, where the radio network temporary identifier is determined based on the offset or another offset different from the offset when a 2-step random access channel (RACH) procedure is used.

31. The apparatus of claim 30, where the offset or the another offset is calculated from a function or a formula.

32. The apparatus of claim 30, where the offset or the another offset is 14×80×8×2.

33. The apparatus of claim 30, where the apparatus is further caused to:
    determine the offset or the another offset to be 14×80×8×2.

34. The apparatus of claim 30, where the offset or the another offset is a fixed value.

35. The apparatus of claim 29, where the radio network temporary identifier is associated with a physical random access channel (PRACH) occasion in which a random access preamble is transmitted.

* * * * *